W. W. SEAY.
PROCESS OF REFRIGERATION.
APPLICATION FILED JAN. 4, 1909.
926,080.
Patented June 22, 1909.
2 SHEETS—SHEET 1.
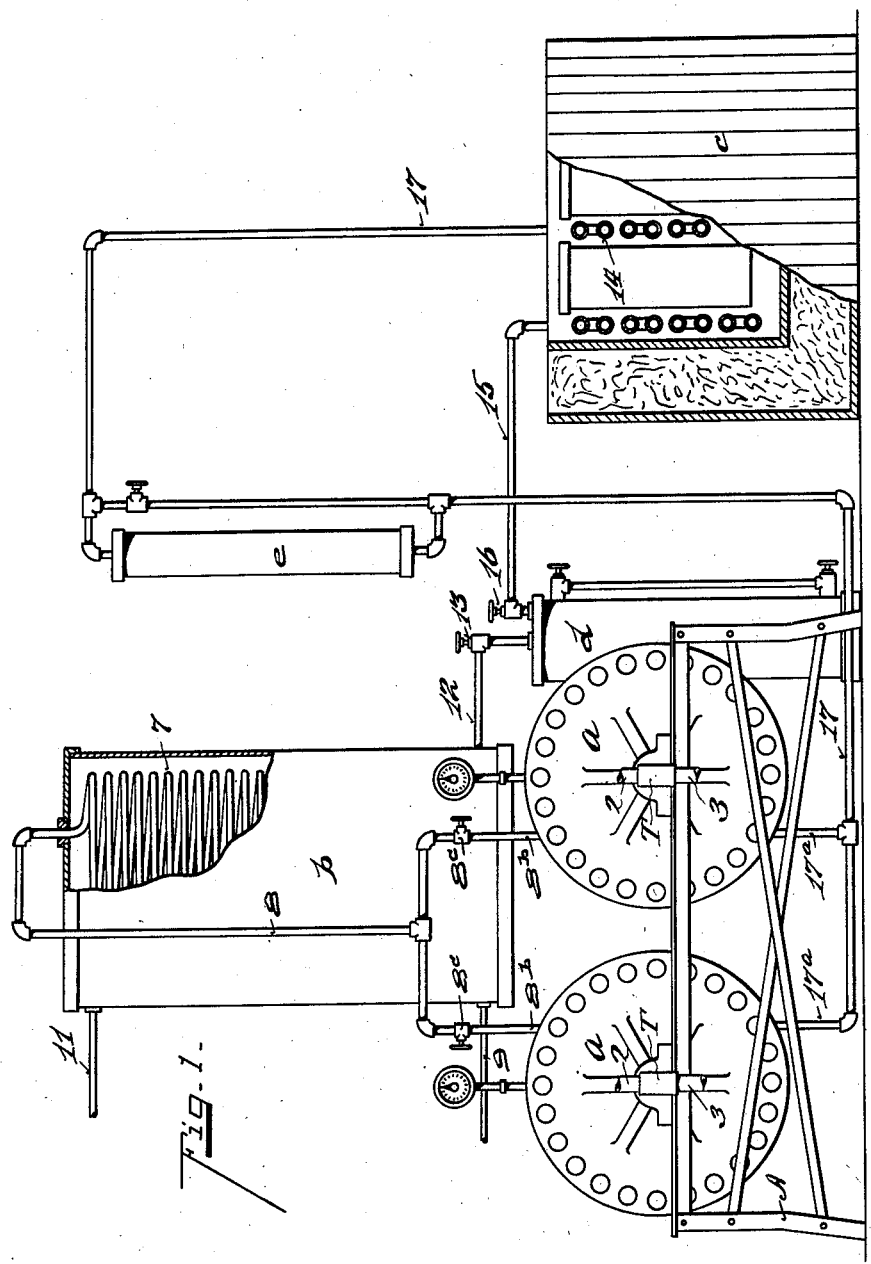
Fig. 1.
Witnesses
Olive B. Kaiser
L. Beck
Inventor
William W. Seay
By 
Attorneys W. W. SEAY.
PROCESS OF REFRIGERATION.
APPLICATION FILED JAN. 4, 1909.
926,080.
Patented June 22, 1909.
2 SHEETS—SHEET 2.
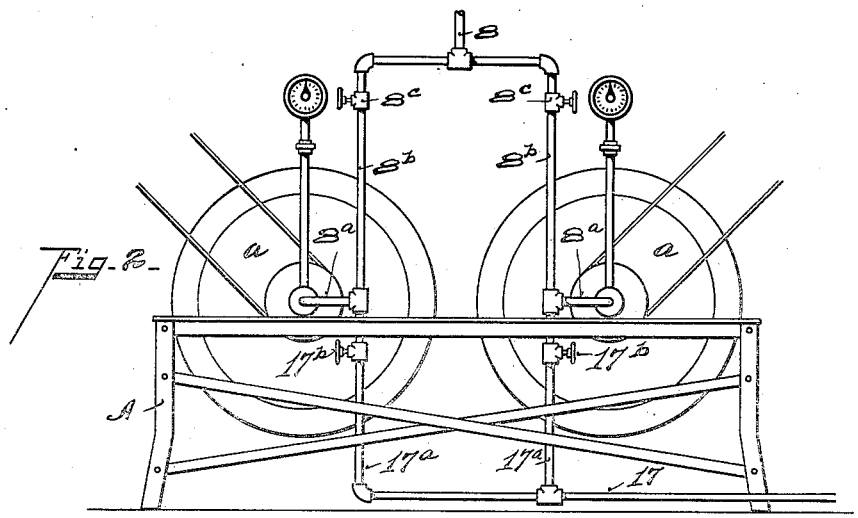
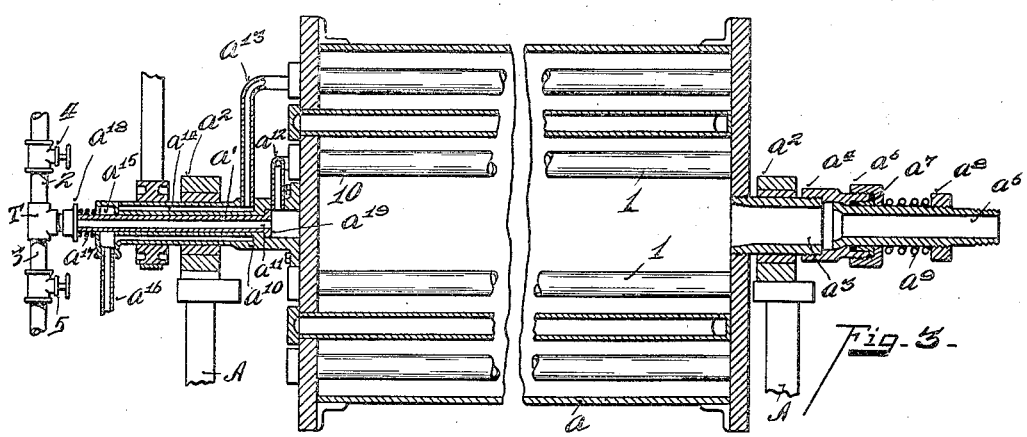
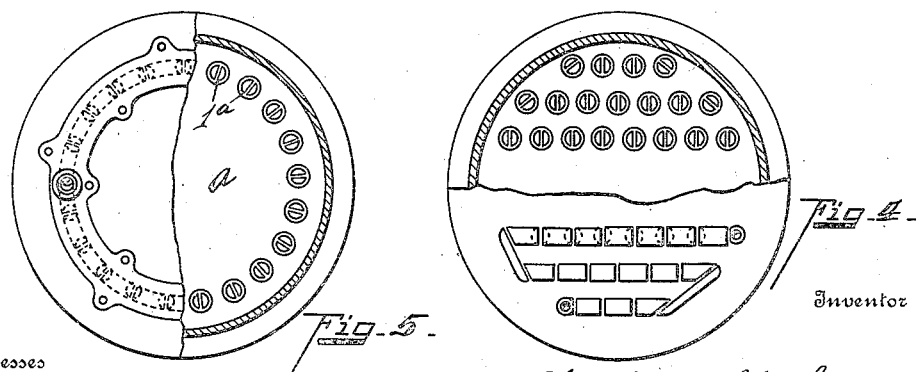

UNITED STATES PATENT OFFICE.

WILLIAM W. SEAY, OF SAN FRANCISCO, CALIFORNIA.

PROCESS OF REFRIGERATION.

No. 926,080.     Specification of Letters Patent.     Patented June 22, 1909.

Original application filed June 12, 1906, Serial No. 401,988. Divided and this application filed January 4, 1909. Serial No. 470,561.

*To all whom it may concern:*

Be it known that I, WILLIAM W. SEAY, a citizen of the United States, residing at San Francisco, in the county of San Francisco and State of California, have invented certain new and useful Improvements in Processes of Refrigeration, of which the following is a specification.

My invention relates to an improvement in the process of refrigeration.

The present invention comprises a refinement of the process broadly described and claimed in my former application, originally filed March 28th, 1905, Serial No. 252,571, and renewed November 13th, 1907, present Serial No. 401,987. Also the apparatus used in connection with my process and shown in the accompanying drawings, forms the subject-matter of a prior application by me, originally filed June 12th, 1906, Serial No. 321,405, and renewed November 13, 1907, present Serial No. 401,988. The subject-matter of the present application being completely disclosed in my former application, Serial No. 321,403, June 12, 1906, renewed November 13, 1907, Serial No. 401,988. This present application is a division of the subject-matter disclosed in my prior applications.

In the first named application, I described and claimed, the basic process in which a solid chemical reagent was employed to condense and absorb the expanded ammonia gas after refrigeration, both the solid and gas becoming liquefied by the contact, and then volatilizing out the ammonia gas from the solution and resolidifying the reagent, recondensing the expelled gas and then allowing the liquid ammonium to flow into the refrigerating apparatus for expansion.

The object of this invention is to make the process continuous, to which end I provide means for condensing a given quantity of the expanded gas into one body of the reagent while volatilizing a previously condensed quantity of refrigerant gas from a second body of the reagent, and of alternating the steps so that each body of the solid reagent becomes in turn an absorber and a generator.

Another object of the invention is to bodily invert the solid absorbents intermediate their periods of condensation and volatilization, so as to always present the reagent to the incoming charge of the expanded gas in the physical condition most favorable for effecting the thorough transformation of both solid and gas into the liquid solution.

Another object of the invention is to agitate the liquid formed by the mutual reaction of the solid reagent and the expanded ammonia gas, in order to obtain a fuller absorbing efficiency from the solution.

The invention is illustrated in the accompanying drawings, in which:—

Figure 1 is a front elevation with parts in section. Fig. 2 is a partial rear elevation. Fig. 3 is a central longitudinal section through one of the generators. Fig. 4 is a view of one of the generators partially in section. Fig. 5 is a sectional detail of a modification.

Referring by reference characters to this drawing, $a$, $a$, designate the absorbing and generating tanks, which may conveniently be of cylindrical form, and of which I prefer to use two for the purpose which will hereinafter appear. These tanks have hollow trunnions $a'$ which are journaled in suitable bearings $a^2$ on a suitable supporting frame A. Each has an interior coil which is in communication through the hollow trunnion at one end by means of suitable pipe connections with the hot and cold water supply pipes 2 and 3 provided with suitable cocks 4 and 5 by which hot or cold water can be supplied to the coil in alternation as desired. The interior of each tank or generator is in communication through its hollow trunnion by a short pipe section $8^a$ with branch pipes $8^b$ which unite in or are connected to the pipe 8 and which leads to a condenser $b$. The condenser $b$ is a tank having an interior coil 7, which is in connection with the pipe 8. The condenser tank has an inlet pipe 9 and an outlet pipe 11 for the condensing water. The condenser coil 7 is connected to a receiver $d$ for the liquid anhydrous ammonia by pipe 12 having a suitable cock 13. A refrigerator is indicated at $c$ which may be of the ordinary or any desired construction according to its destined employment for making ice or for cooling storage chambers as used in the arts generally.

For convenience I have shown this refrigerator as a freezing tank adapted to be filled with brine and to receive cans and having an interior coil 14 which is connected to the receiver $d$ by pipe 15 having an expansion cock 16. Through this pipe 15 the anhydrous liquid ammonia is supplied to the refrigerator. The other end of the coil 14 communicates by a pipe 17 and branch pipes $17^a$ with the pipes $8^a$ leading into the tanks $a$, suitable stop cocks $17^b$ being provided in these pipes $17^a$. If desired, I may pass the expanded ammonia vapor going through the pipe 17 through a drier $e$ connected to the pipe 17 by branch pipes as shown, but if perfectly anhydrous ammonia is used, such a drier will not be needed.

It will be understood that my invention contemplates the employment in the tanks $a$ of a solid absorbent, such as sulfo-cyanid of ammonium—$NH_4CyS$, which easily combines with liquid anhydrous ammonia or ammonia vapor, and by such process it becomes liquefied and forms with the ammonia a solution. After the ammonia and the solid absorbent have both gone into liquid solution, hot water or steam is introduced into the coils of the absorber and generator and the liquefied ammonia vaporized and driven off through the pipe 8 and introduced into the condensing tank, whence it passes in the form of liquid ammonia into the receiver $d$. It then passes through the coils 14 of the refrigerator where it is expanded and consequently abstracts heat from the freezing tank producing the ordinary refrigerating effect. After all the available ammonia has been driven out from the absorbent, by the heat from the hot water coils of the generator and the condensation effect produced, the supply of hot water is cut off, and a supply of cold water turned into the coils of the generator, which now becomes the absorber, the cocks $17^b$ now being open and the cocks $8^c$ being closed. The expanded ammonia gas now passes by the pipe 17 back to the tank $a$, which now acts as an absorber, where it is reabsorbed.

From the foregoing description it will be seen that were I to use but a single tank $a$ a continuous refrigerating effect upon the refrigerator could not be secured, as there would be alternate periods during which a single tank $a$ would be absorbing and vaporizing. It is to avoid this intermittent action that I provide two tanks with their appropriate connections, and as the periods of absorption and vaporization are practically of equal duration, by the use of two tanks, I secure a continuous refrigerating effect.

I have found that when ammonia is being driven by the heat off from the absorbent, the absorbent tends to settle and form in a solid mass in the bottom of the generator. If the expanded ammonia vapor were allowed to enter the tank $a$ with the absorbent at the bottom of the tank in this solid condition, the action of the vapor would be to cause a liquid film to form over the surface of the solid absorbent which would tend to retard the absorbing action. It is to avoid this that I mount the tanks $a$ on trunnions so as to be capable of being turned. By this construction when a tank is to act as the absorber its position is reversed so that the solid absorbent adhering to the rotatable element is now at the top and the ammonia vapor acts on the under surface of the solid absorbent. As fast as the vapor is liquefied and the absorbent likewise liquefied it falls away into the bottom of the tank leaving a fresh surface of the solid absorbent exposed to the action of the vapor. This is a convenient and efficient method of shifting the positions of the solid absorbent relative to the incoming charge of refrigerant gas. I have found further that after all of the solid absorbent has become liquefied under these conditions it will have absorbed a certain amount of ammonia and will not absorb more if left in a quiescent state. If, however, the liquid be agitated it will continue to absorb the ammonia vapor up to a considerable further degree. For this reason I find it very desirable to arrange the coil, 1, within each tank $a$ in a circular or annular form, as shown at $1^a$ in Fig. 5 and to provide means by which each tank may be continuously rotated during the absorbing action, thereby hastening such action very materially and increasing its efficiency as by the agitation thus effected a larger percentage of the ammonia vapor will be absorbed and the gain in efficiency will far outweigh the cost of rotation. It will be understood, however, that the continuous rotation of the tank is simply representative of any means for agitating the liquid contents of the tank.

While any suitable form of hollow trunnion may be used to lead the refrigerant into and from the tanks $a$ and the heating and cooling medium into and from the coils 1, I prefer to use the construction shown in detail in Fig. 3. The trunnion through which the refrigerant is introduced is shown on the right of this figure. It comprises a tubular member $a^3$ journaled in the bearing $a^2$ to which is connected a coupling member $a^4$ having an internal flange engaging a corresponding external flange on the pipe section $a^5$, which connects with the branch $8^a$. The section $a^5$ is surrounded by a collar $a^6$ which has a flange screwed on to the coupling member $a^4$. Between this collar and coupling member is located a suitable packing material $a^7$. A second collar $a^8$ is rigidly but adjustably secured on the pipe $a^5$ and between it and the collar $a^6$ is located a helical spring $a^9$ which tends to keep the flange on the inner end of pipe $a^5$ pressed against the internal flange of coupling member $a^4$. The particular means by which the heating and cooling medium is supplied is shown on the left of Fig. 3.

The shaft $a^{10}$ which is secured rigidly to the head of the tank or drum has a central longitudinal passage $a^{11}$ at one end which is in communication at its outer end by a suitable T coupling with the pipes 2 and 3. At its inner end this passage communicates by a lateral branch $a^{12}$ with one end of the coil 10. The other end of the coil communicates by a pipe $a^{13}$ with a passage $a^{14}$ in the member $a^{10}$. This passage at its outer end communicates with a junction box or casing $a^{15}$ which has a waste pipe $a^{16}$. A spring $a^{17}$ located between a collar $a^{18}$ on pipe $a^{11}$ and the junction box serves the double function of keeping the flanged end $a^{19}$ of the pipe $a^{11}$ pressed against a corresponding flange or shoulder of the shaft $a^{10}$, and holding the junction box against the end of shaft or trunnion $a^{10}$ to effect a tight joint.

The bodily inversion of the solid chemical after it is precipitated out of the solution and preparatory to the absorbing step, is a generic step of the process, and the rotation of the solid body is a specific and the preferred step of the process. The process may be carried on successfully by bodily inverting the container after the solid has been formed, and allowing it to remain fixed in this transposed position during the absorbing period, as this form of inversion would expose a new surface of the solid to the influence of the expanded gas from the refrigerator. For as fast as the expanded gas would be condensed and liquefy the chemical the solution would trickle away and leave a constantly fresh surface exposed to its action. Again, when the chemical is allowed to be deposited in the lower part of the apparatus, its exposed superficial area when inverted is not so great, as when it is deposited uniformly over the whole inner periphery. This latter deposition is accomplished by the rotation during the generation or volatilizing period. I therefore prefer the continuous rotation as it produces a constant agitation of the liquid when formed during the absorption, as well as in volatilizing or generating period.

Having described my invention, I claim:—

1. In the art of refrigeration, the process of absorbing the expanded refrigerant gas into a solid reagent, both being liquefied by the contact, then volatilizing the refrigerant from the solution and resolidifying the reagent, condensing the expelled gas into a liquid, expanding the liquid in the zone of the article to be cooled, and inverting the solid reagent after each volatilizing period and prior to the absorbing period, substantially as described.

2. In the art of refrigeration, the process of absorbing the expanded refrigerant gas into one body of a solid reagent, volatilizing a condensed charge of the refrigerant from a liquid solution formed with another body of said reagent, and inverting each of said solid bodies intermediate its condensing and volatilizing periods, substantially as described.

3. In the art of refrigeration, the process of absorbing the expanded refrigerant gas into a solid reagent, both being liquefied by the contact, agitating the solution when formed during the absorbing period, volatilizing the refrigerant from the solution and resolidifying the reagent, condensing the expelled gas into a liquid, and expanding the liquid in the zone of the article to be cooled, substantially as described.

4. In the art of refrigeration, the process of absorbing the expanded refrigerant gas into one body of a solid reagent, both being liquefied by the contact, volatilizing a condensed charge of the refrigerant from a solution formed with a separate body of said solid reagent, inverting each of said solid bodies intermediate its condensing and volatilizing periods and agitating each solution when formed during the absorbing period, substantially as described.

5. In the art of refrigeration, the process of alternately absorbing successive charges of the expanded refrigerant gas into liquid solution with two different bodies of a solid absorbent, alternately volatilizing the refrigerant from said solution, resolidifying the reagent, and shifting the position of each of said bodies of the solid absorbent relative to the incoming charge of expanded refrigerant gas intermediate their absorbing and volatilizing periods, substantially as described.

6. In the art of refrigeration, the process of alternately absorbing successive charges of the refrigerant gas into liquid solution with two different bodies of a solid absorbent, alternately volatilizing the refrigerant from said solution, resolidifying the absorbent, and rotating the absorbent container to shift the position of the absorbent relative to the incoming expanded refrigerant gas and to agitate the solution during the absorbing period, substantially as described.

7. In the art of refrigeration, the process of combining in one tank expanded refrigerant gas with an absorbent formed from a chemical having the property of going from a solid state into a liquid solution with said gas, simultaneously volatilizing anhydrous refrigerant gas from a similar absorbent solution in another tank, simultaneously flowing anhydrous refrigerant gas from the generator tank into a condenser and flowing the expanded refrigerant gas from the refrigerator into the absorbent tank, and utilizing the refrigerant gas separated from the absorbent to produce a cooling effect.

8. In the art of refrigeration, the process of continuously performing the following steps, combining in one tank expanded refrigerant gas with an absorbent formed from a chemical having the property of going from a solid state into a liquid solution with said gas, volatilizing anhydrous refrigerant gas from a similar absorbent solution in another tank, flowing anhydrous refrigerant gas from the generator tank into a condenser, and flowing the expanded refrigerant gas from the refrigerator into the absorbent tank, and utilizing the refrigerant gas separated from the absorbent to produce a cooling effect.

In testimony whereof, I have hereunto set my hand.

WILLIAM W. SEAY.

Witnesses:
   OLIVER B. KAISER,
   S. BECK.